(12) United States Patent
Niioka

(10) Patent No.: US 11,960,647 B2
(45) Date of Patent: Apr. 16, 2024

(54) CONTENT DISPLAY DEVICE, CONTENT DISPLAY METHOD, AND STORAGE MEDIUM USING GAZING POINT IDENTIFICATION BASED ON LINE-OF-SIGHT DIRECTION DETECTION

(71) Applicant: Sharp NEC Display Solutions, Ltd., Tokyo (JP)

(72) Inventor: Shinya Niioka, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/959,728

(22) Filed: Oct. 4, 2022

(65) Prior Publication Data
US 2023/0036042 A1 Feb. 2, 2023

Related U.S. Application Data

(63) Continuation of application No. PCT/JP2020/017707, filed on Apr. 24, 2020.

(51) Int. Cl.
*G06F 3/01* (2006.01)
*G06F 3/14* (2006.01)

(52) U.S. Cl.
CPC .............. *G06F 3/013* (2013.01); *G06F 3/14* (2013.01)

(58) Field of Classification Search
CPC ........... G06F 2203/04803; G06F 3/013; G06F 3/0482; G06F 3/04842; G06F 3/14;
(Continued)

(56) References Cited

U.S. PATENT DOCUMENTS

2005/0114231 A1* 5/2005 Kinjo ................. G06Q 30/0269
705/26.1
2011/0032274 A1 2/2011 Miyata
(Continued)

FOREIGN PATENT DOCUMENTS

JP 2011-055382 A 3/2011
JP 2015-090524 A 5/2015
(Continued)

OTHER PUBLICATIONS

International Search Report (ISR) (PCT Form PCT/ISA/210), in PCT/JP2020/017707, dated Jun. 23, 2020.

*Primary Examiner* — Richard J Hong
(74) *Attorney, Agent, or Firm* — MCGINN I.P. LAW GROUP, PLLC

(57) ABSTRACT

A content display device includes a line-of-sight direction detection unit, a gazing point identification unit, a gazing content identification unit, and a display control unit. The line-of-sight direction detection unit is configured to detect a line-of-sight direction of a person located in a vicinity of a display region in which a plurality of contents are simultaneously displayed. The gazing point identification unit is configured to, based on the line-of-sight direction, identify a gazing point in the display region of the person. The gazing content identification unit is configured to, based on a distribution of the gazing point detected in a predetermined period, identify a gazing content at which the person is gazing. The display control unit configured to determine a display mode of each of the plurality of contents, based on a result of identifying the gazing content, and display each of the plurality of contents in the display mode determined.

12 Claims, 14 Drawing Sheets

(58) Field of Classification Search
CPC ............... G06F 3/1446; G06F 3/0488; G09G 2340/0414; G09G 2340/0421; G09G 2354/00; G09G 2360/04; G09G 5/14; H04N 21/431; H04N 21/440263; G06Q 30/0269; G06V 40/193
See application file for complete search history.

(56) References Cited

U.S. PATENT DOCUMENTS

| | | | |
|---|---|---|---|
| 2011/0267374 A1 | 11/2011 | Sakata et al. | |
| 2013/0063668 A1* | 3/2013 | Yamashita | H04N 21/440263 348/E5.122 |
| 2015/0126167 A1 | 5/2015 | Ikeda et al. | |
| 2016/0188962 A1* | 6/2016 | Taguchi | G06V 40/193 382/117 |
| 2017/0127011 A1* | 5/2017 | Okajima | G09G 5/14 |
| 2020/0128177 A1* | 4/2020 | Gotou | H04N 21/431 |

FOREIGN PATENT DOCUMENTS

| | | | |
|---|---|---|---|
| JP | 2017-156665 A | 9/2017 | |
| KR | 2089804 B1 * | 3/2020 | ............ G06F 3/0488 |
| WO | WO 2009/125481 A1 | 10/2009 | |
| WO | WO 2010/089989 A1 | 8/2010 | |
| WO | WO 2018/235595 A1 | 12/2018 | |

* cited by examiner

FIG. 14

| TERMINAL INFORMATION (BEST PICK-UPS) | RATE (%) |
|---|---|
| INFORMATION A | 33 |
| INFORMATION C | 25 |
| INFORMATION B | 16 |
| INFORMATION D | 8 |
| ⋮ | ⋮ |

CONTENT DISPLAY DEVICE, CONTENT DISPLAY METHOD, AND STORAGE MEDIUM USING GAZING POINT IDENTIFICATION BASED ON LINE-OF-SIGHT DIRECTION DETECTION

This application is a Continuation of PCT International Application No. PCT/JP2020/017707 filed on Apr. 24, 2020, which is hereby incorporated by reference into the present application.

TECHNICAL FIELD

The present disclosure relates to a content display device, a content display method, and a storage medium.

BACKGROUND ART

Patent Document 1 discloses a technique of when displaying on a screen notification information for notifying a user, determining an initial display position of the notification information according to a degree of concentration of the user on the screen, thereby presenting the notification information to the user without giving a sudden impression to the user. Further, Patent Document 2 discloses a technique of displaying small screens on an image display surface according to a detected line-of-sight position of a user, and controlling division and integration of each small screen according to distances of a plurality of users. Further, Patent Document 3 describes a technique of determining a gazing region of a user from a line of sight of the user, determining an enlarged region from a posture of the user, enlarging an image displayed in the gazing area, and displaying the enlarged image in the enlarged region.

CITATION LIST

Patent Document

Patent Document 1: International Publication No. 2010/089989
Patent Document 2: International Publication No. 2009/125481
Patent Document 3: Japanese Unexamined Patent Application Publication No. 2017-156665

SUMMARY

The effects of contents such as advertisements and news arise by people actually seeing the contents. In order to enhance the effects of the contents, it is important to have as many people as possible see the contents.

Embodiments of the present disclosure have been made in view of the above problems. One of the objects of the present disclosure is to provide a technique of enhancing the effects achieved by displaying the contents.

A content display device according to an embodiment of the present disclosure comprises:
line-of-sight direction detection means configured to detect a line-of-sight direction of a person located in a vicinity of a display region in which a plurality of contents are simultaneously displayed;
gazing point identification means configured to, based on the line-of-sight direction, identify a gazing point in the display region of the person;
gazing content identification means configured to, based on a distribution of the gazing point detected in a predetermined period, identify a gazing content at which the person is gazing; and
display control means configured to
determine a display mode of each of the plurality of contents, based on a result of identifying the gazing content, and
display each of the plurality of contents in the display mode determined.

A content display method for a computer according to another embodiment of the present disclosure comprises:
detecting a line-of-sight direction of a person located in a vicinity of a display region in which a plurality of contents are simultaneously displayed;
based on the line-of-sight direction, identifying a gazing point in the display region of the person;
based on a distribution of the gazing point detected in a predetermined period, identifying a gazing content at which the person is gazing;
determining a display mode of each of the plurality of contents, based on a result of identifying the gazing content; and
displaying each of the plurality of contents in the display mode determined.

A non-transitory computer-readable storage medium according to another embodiment of the present disclosure stores a program causing a computer to:
detect a line-of-sight direction of a person located in a vicinity of a display region in which a plurality of contents are simultaneously displayed;
based on the line-of-sight direction, identify a gazing point in the display region of the person;
based on a distribution of the gazing point detected in a predetermined period, identify a gazing content at which the person is gazing; and
determine a display mode of each of the plurality of contents, based on a result of identifying the gazing content; and
display each of the plurality of contents in the display mode determined.

According to the embodiments of the present disclosure, the effects achieved by displaying the contents can be enhanced.

BRIEF DESCRIPTION OF THE DRAWINGS

FIG. 14 is a diagram showing an example of a result of collecting preference information.

DETAILED DESCRIPTION

Figure 1:
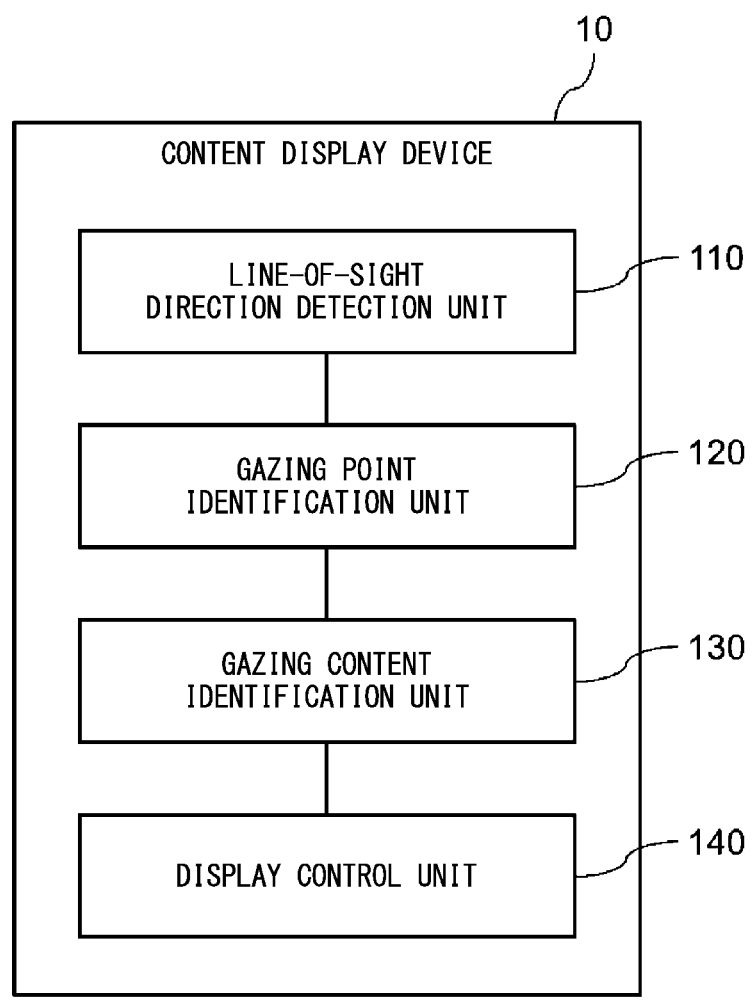
FIG. 1 is a diagram showing an example of a functional configuration of a content display device according to a first embodiment.

Hereinafter, embodiments of the present disclosure will be described with reference to the drawings. In all of the drawings, like components are designated by like reference numerals, and the description thereof will be omitted as appropriate. Further, in each block diagram, each block represents a configuration of a functional unit, not a configuration of a hardware unit, unless otherwise specified. Further, a direction of an arrow in the figure is for easy understanding of the flow of information, and does not limit a direction of communication (one-way communication/two-way communication), unless otherwise specified.

First Embodiment

A content display device 10 according to a first embodiment controls the display of contents displayed in a predetermined display region by a video device, such as a monitor or a projector. Here, the contents displayed in the display region may be still images or moving images. These contents may be stored in a storage device included in the content display device 10, or may be stored in an external device (device that distributes the contents) connected via a network (not shown).

<Functional Configuration Example>

FIG. 1 is a diagram showing an example of a functional configuration of a content display device according to a first embodiment. As shown in FIG. 1, the content display device 10 includes a line-of-sight direction detection unit 110, a gazing point identification unit 120, a gazing content identification unit 130, and a display control unit 140.

The line-of-sight direction detection unit 110 detects a line-of-sight direction of a person located in a vicinity of the display region in which a plurality of contents are displayed at the same time. For example, the line-of-sight direction detection unit 110 acquires an image (an image in which a person is captured) from an image capture device that covers an area in the vicinity of the display region in a shooting range, and analyzes the image to detect the line-of-sight direction of the person. Here, the line-of-sight direction detection unit 110 detects the line-of-sight direction of each person detected from the image. For example, when the line-of-sight direction detection unit 110 acquires an image showing one person as an image to be processed, the line-of-sight direction detection unit 110 detects the line-of-sight direction of that person. Further, for example, when the line-of-sight direction detection unit 110 acquires an image showing two people as an image to be processed, the line-of-sight direction detection unit 110 detects the line-of-sight direction for each of the two people. Specific operation of the line-of-sight direction detection unit 110 will be described later.

The gazing point identification unit 120 identifies a gazing point of the person in the display region based on the line-of-sight direction of the person detected by the line-of-sight direction detecting unit 110. Specific operation of the gazing point identification unit 120 will be described later.

The gazing content identification unit 130 identifies a content (hereinafter, also referred to as "gazing content") at which the person shown in the image is gazing, based on a distribution of the gazing points detected in a predetermined period. Specific operation of the gazing content identification unit 130 will be described later.

The display control unit 140 determines a display mode of each content based on a result of identifying the gazing content by the gazing content identification unit 130. Further, the display control unit 140 displays each content in the display region in the determined display mode. Specific operation of the display control unit 140 will be described later.

<Hardware Configuration Example>

The content display device 10 may be realized by hardware that realizes each functional component (e.g., a hard-wired electronic circuit, etc.), or a combination of hardware and software (e.g., a combination of an electronic circuit and a program that controls it). Hereinafter, a case where the content display device 10 is realized by a combination of hardware and software will be further described.

Figure 2:
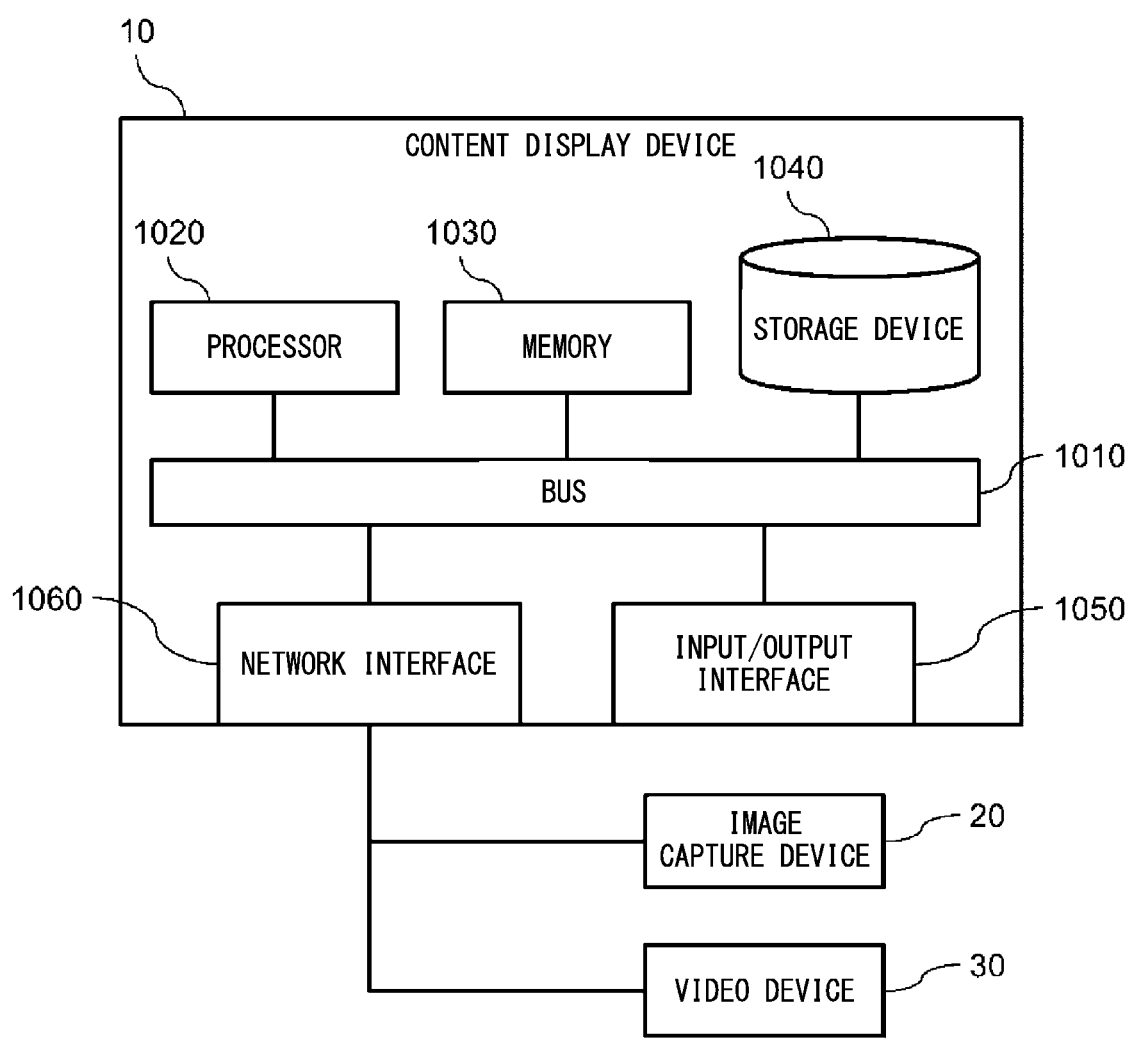
FIG. 2 is a block diagram illustrating a hardware configuration of the content display device.

FIG. 2 is a block diagram illustrating a hardware configuration of the content display device 10.

The content display device 10 includes a bus 1010, a processor 1020, memory 1030, a storage device 1040, an input/output interface 1050, and a network interface 1060.

The bus 1010 is a data transmission path for the processor 1020, the memory 1030, the storage device 1040, the input/output interface 1050, and the network interface 1060 to transmit and receive data to and from one another. Here, the method of connecting the processor 1020 and the like to one another is not limited to the bus connection.

The processor 1020 is a processor realized by a CPU (Central Processing Unit), a GPU (Graphics Processing Unit), or the like.

The memory 1030 is a main storage device realized by a RAM (Random Access Memory) or the like.

The storage device 1040 is an auxiliary storage device realized by an HDD (Hard Disk Drive), an SSD (Solid State Drive), a memory card, a ROM (Read Only Memory), or the like. The storage device 1040 stores a program module that realizes each function of the content display device 10 (the line-of-sight direction detection unit 110, the gazing point identification unit 120, the gazing content identification unit 130, the display control unit 140, and the like). When the processor 1020 reads each of these program modules into the memory 1030 and executes them, each function corresponding to each program module is realized. Data of a plurality of contents displayed in the display region may be stored in the storage device 1040.

The input/output interface 1050 is an interface for connecting the content display device 10 and peripheral devices. Peripheral devices include, for example, input/output devices, such as a keyboard, a mouse, a display (touch panel display), and a speaker.

The network interface 1060 is an interface for connecting the content display device 10 to a network. This network is, for example, a LAN (Local Area Network) or a WAN (Wide Area Network). The method of connecting the network interface 1060 to the network may be a wireless connection or a wired connection. The content display device 10 is communicably connected via the network interface 1060 to an external device, such as an image capture device 20 or a video device 30.

The image capture device 20 is, for example, a camera equipped with a CCD (Charge Coupled Device) image sensor or a CMOS (Complementary Metal Oxide Semiconductor) image sensor. The line-of-sight direction detection unit 110 can acquire, via the network interface 1060, video data generated by the image capture device 20. The video device 30 is a monitor having a display region or a projector that projects an image on a screen (display region).

Here, the configuration illustrated in FIG. 2 is merely an example, and the hardware configuration including the content display device 10 is not limited to the example of FIG. 2. For example, each function of the content display device 10 may be configured such that the video device 30 has each function of the content display device 10 and also functions as the content display device 10.

<Processing Flow>

Figure 3:
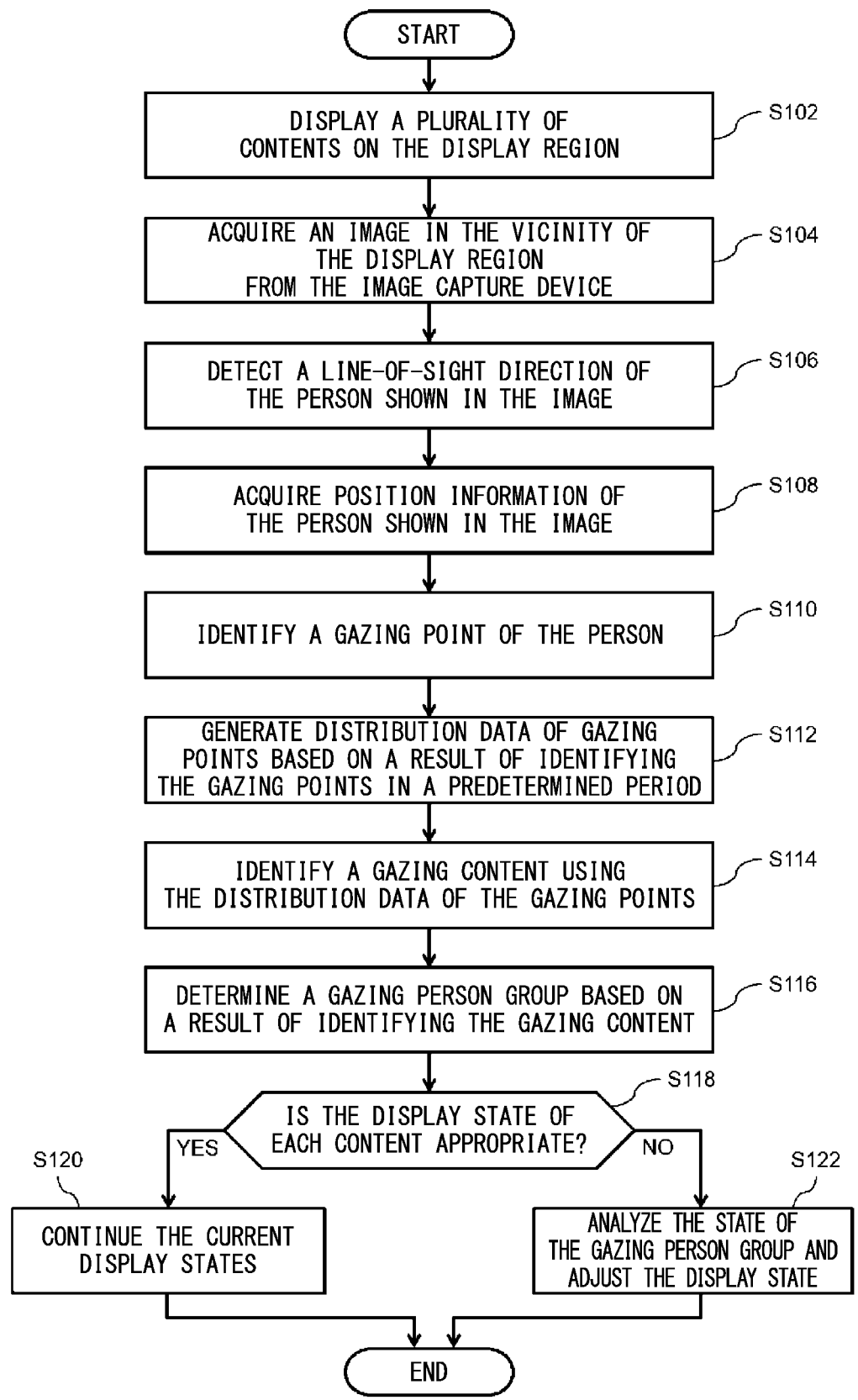
FIG. 3 is a flowchart illustrating a flow of processing executed by the content display device according to the first embodiment.

FIG. 3 is a flowchart illustrating a flow of processing executed by the content display device 10 according to the first embodiment.

First, the content display device 10 simultaneously displays a plurality of contents on the display region (S102). A plurality of small regions are set in the display region, and the content display device 10 determines an arrangement of the contents (assignment of the contents to the respective small regions), and displays the contents in the respective small regions according to the determined arrangement. In the present embodiment, for example, the content display device 10 randomly determines a plurality of contents and the arrangement of the respective contents. During this time, the image capture device 20 generates an image of a person present in the vicinity of the display region (a person who is viewing the contents displayed in the display region).

The line-of-sight direction detection unit 110 acquires the image (the image in the vicinity of the display region) generated by the image capture device 20 (S104). Then, the line-of-sight direction detection unit 110 analyzes the acquired image and detects a line-of-sight direction of the person shown in the image (S106). When a plurality of persons are present in the vicinity of the display region and captured, the line-of-sight direction detection unit 110 detects the line-of-sight direction for each of the plurality of persons. For example, using a known algorithm for detecting the line-of-sight of the person shown in the image, the line-of-sight direction detection unit 110 can detect the line-of-sight direction of the person shown in the image.

Then, the gazing point identification unit 120 acquires position information of the person shown in the image (S108). When a plurality of persons are present in the vicinity of the display region, the gazing point identification unit 120 acquires position information for each of the plurality of persons. For example, using a short-range communication device (not shown) provided in the vicinity of the display region, the gazing point identification unit 120 can acquire position information of a terminal possessed by the person present in the vicinity of the display region, and use the acquired position information as the position information of the person. Further, for example, using a plurality of images captured using a plurality of image capture devices 20, the gazing point identification unit 120 can calculate the position of the person with respect to a reference point (for example, the position of the display region). Further, for example, using a distance measurement sensor (not shown), such as an infrared sensor or an ultrasonic sensor, the gazing point identification unit 120 can acquire information indicating the position of the person with respect to a reference point (for example, the position of the display region).

Figure 4:
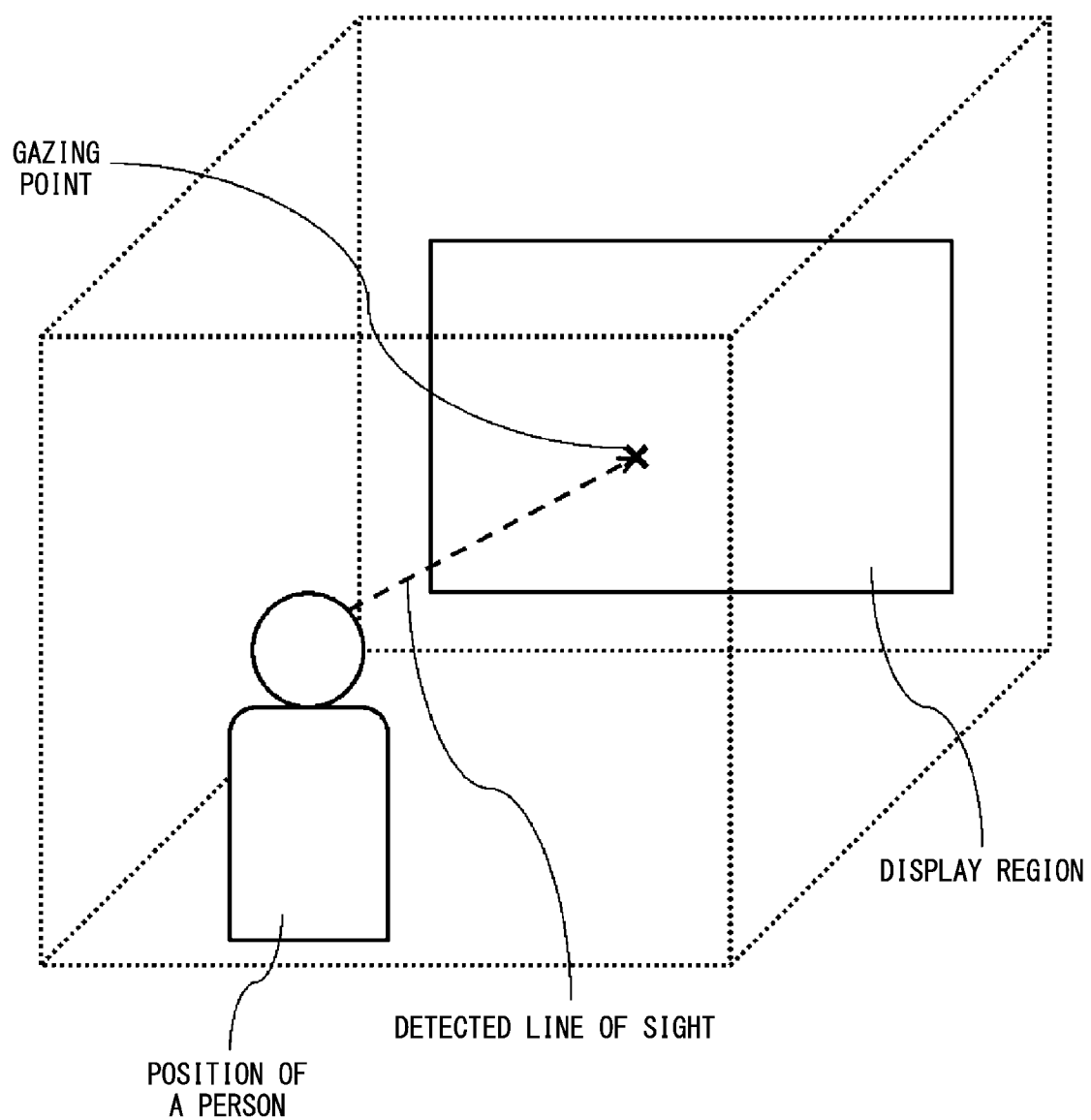
FIG. 4 is a diagram schematically explaining a method of identifying a gazing point of a person.

Then, the gazing point identification unit 120 identifies a gazing point of the person present in the vicinity of the display region (S110). For example, using the line-of-sight direction of the person detected in the process of S104 and the position information of the person acquired in the process of S108, the gazing point identification unit 120 identify a portion (gazing point) at which the person is gazing on the display region. For example, as shown in FIG. 4, the gazing point identification unit 120 can extend, in a certain coordinate system, a line segment from the position of the person indicated by the position information in the line-of-sight direction detected for the person, and identify the point where the line segment intersects the display region, as the gazing point of the person. FIG. 4 is a diagram schematically illustrating a method of identifying a gazing point of a person.

Figure 5:
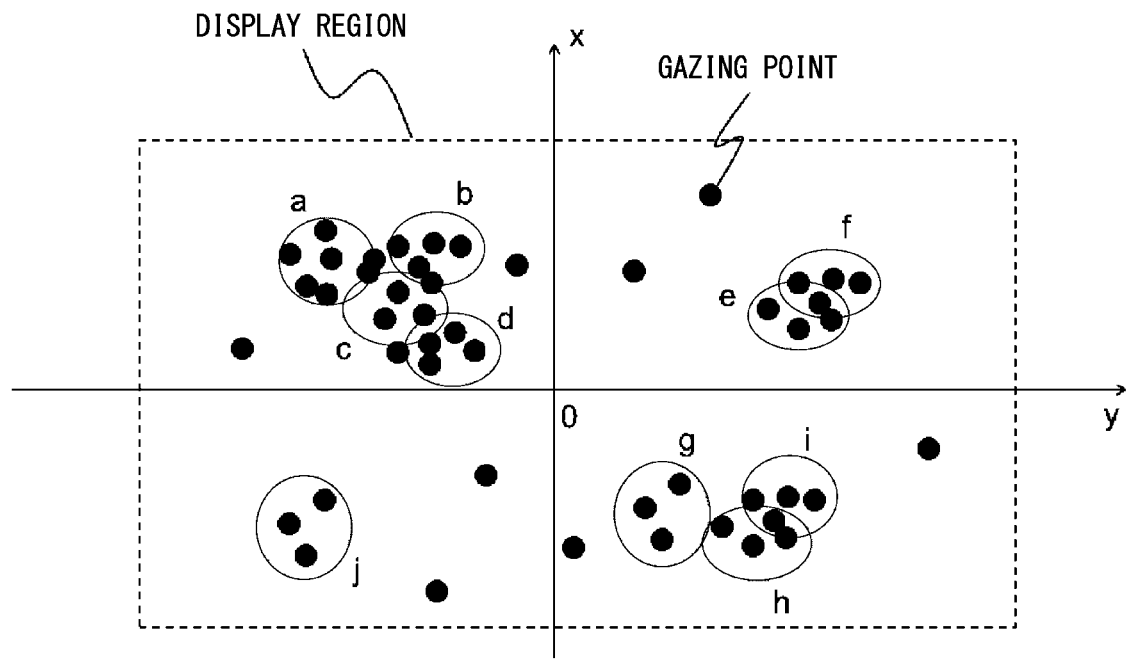
FIG. 5 is a diagram showing an example of distribution data generated by a gazing point identification unit.

The gazing point identification unit 120 generates distribution data (example: FIG. 5) showing a distribution of gazing points, based on a result of identifying the gazing points in a predetermined period (S112). FIG. 5 is a diagram showing an example of the distribution data generated by the gazing point identification unit 120. As shown in FIG. 5, when a plurality of persons are present in the vicinity of the display region, the gazing point identification unit 120 generates distribution data of gazing points for each of the plurality of persons. Here, in the example of FIG. 5, the coordinate center 0 corresponds to a central portion of the display region. According to the distribution data exemplified in FIG. 5, the following can be understood.

Four people (a, b, c and d) are gazing at the upper left of the display region.

Two people (e and f) are gazing at the upper right of the display region.

One person (j) is gazing at the lower left of the display region.

Three people (g, h and i) are gazing at the lower right of the display region.

Figure 6:
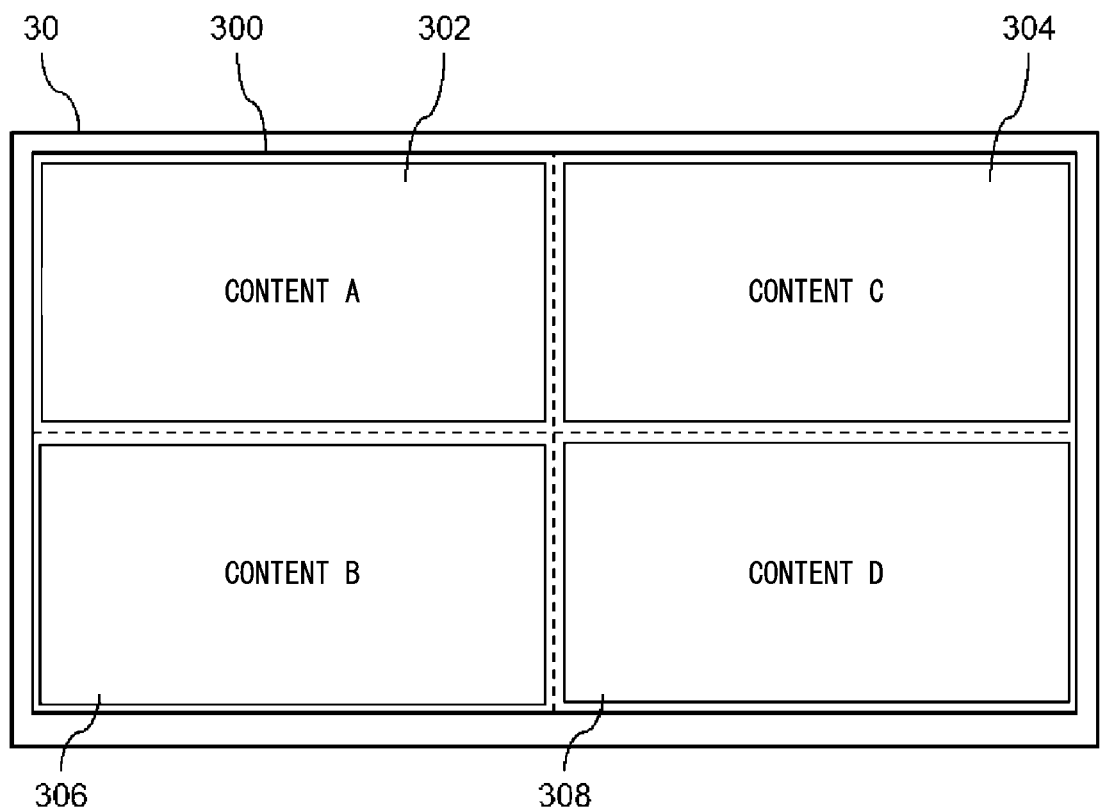
FIG. 6 is a diagram illustrating a display state of contents on a display region.
Figure 7:
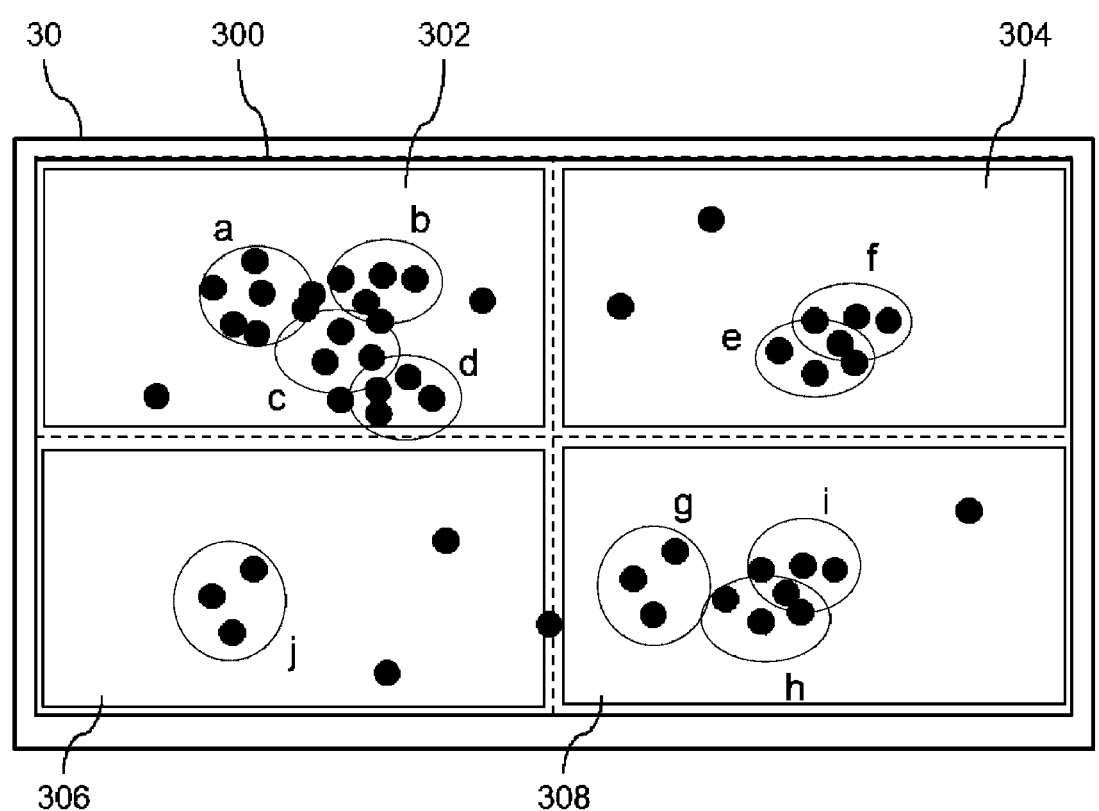
FIG. 7 is a diagram showing a state in which the distribution data of the gazing points of FIG. 5 is superimposed on the display region of FIG. 6.

Then, the gazing content identification unit 130 identifies a gazing content using the distribution data of the gazing points generated in the process of S112 (S114). For example, the gazing content identification unit 130 identifies the content (gazing content) at which each person is gazing, based on the distribution data of the gazing points of each person and the display position of each content. Specific operation of the gazing content identification unit 130 will be described with reference to the example of FIG. 5. In the example of FIG. 5, the gazing points of the person a are concentrated in the upper left of the display region. Here, it is assumed that a plurality of contents are displayed on the display region, as shown in FIG. 6. FIG. 6 is a diagram illustrating a display state of the contents on the display region. In the example of FIG. 6, four small regions 302 to 308 are set in a display region 300 of the video device 30. In addition, content A is displayed in the upper left small region 302, content B is displayed in the upper right small region 304, content C is displayed in the lower left small region 306, and content D is displayed in the lower right small region 308. Here, when the distribution data of the gazing points of FIG. 5 is superimposed on the display region of FIG. 6, a state as shown in FIG. 7 is obtained. FIG. 7 is a diagram showing a state in which the distribution data of the gazing points of FIG. 5 is superimposed on the display region of FIG. 6. As shown in FIG. 7, the gazing points of the person a are concentrated in the upper left small region 302 (i.e., the display position of the content A). The gazing content identification unit 130 can identify the gazing content of the person a as "content A," based on the distribution of the gazing points of the person a and the display position of each content. Similarly, the gazing content identification unit 130 can identify the gazing content of another person, based on the distribution of the gazing points of each person and the display position of each content on the display region.

Then, the display control unit 140 determines a display mode of each content displayed on the display region, based on a result of identifying the gazing contents, and displays each content in the display region according to the determined display mode. In the example of this figure, the display control unit 140 operates as follows.

First, the display control unit 140 determines a group of people (gazing person group) who are gazing at the same content for each content, based on the result of identifying the gazing content for each person (S116). For example, when the distribution data as shown in FIG. 5 is acquired and the contents are displayed in the display region in the state shown in FIG. 6, the gazing content identification unit 130 determines the gazing person group for each content, as follows.

Gazing person group of content A: people a, b, c and d
Gazing person group of content B: person j
Gazing person group of content C: people e and f
Gazing person group of content D: people g, h and i Then, the display control unit 140 determines whether or not the display state of each content is an appropriate state based on the information acquired for the group corresponding to each content (S118). For example, the display control unit 140 determines that the display state is appropriate when a condition that a feature amount cannot be found in the information of the distribution of the gazing points acquired from the group is satisfied. Further, when a condition that a feature amount can be found in the information of the distribution of the gazing points acquired from the group is satisfied, the display control unit 140 determines that the display state is inappropriate, and shifts to a mode of optimizing the display state.

Here, the feature amount can be acquired from a deviation of a two-dimensional distribution state in which the gazing points are mapped, a temporal change in occurrence frequency of the gazing points in the distribution of the gazing points, and the like. Further, the display control unit 140 may extract a feature amount from a movement or posture of each person's face, or a movement of the person such as whether or not the line of sight repeatedly gazes at a specific position.

Further, the display control unit 140 may determine the presence or absence of the feature amount from the presence or absence of a correlation with a feature amount of the line of sight (a deviation of the two-dimensional distribution state of the gazing points on the content or a predicted value of the temporal change in occurrence frequency of the gazing points), which an advertiser has predicted for each content in advance. For example, the display control unit 140 extracts a correlation coefficient between the feature amount of the line of sight predicted in advance and a sampled feature amount, and if the correlation coefficient is equal to or higher than a predetermined threshold value (for example, 0.2), the display control unit 140 can recognize from the correlation coefficient that there is a feature amount. The following techniques are available as a method of quantifying the result of the line-of-sight prediction for the content.

<Visual Attention Software (VAS)>https://multimedia.3m.com/mws/media/10068270/3msm-visual-attention-software-vas-validation-study.pdf The display control unit 140 may store the sampling data of the gazing points and the feature amounts acquired from the sampling data of the gazing points in a storage unit (storage device 1040 or the like) of the content display device 10. The feature amounts acquired in the above-described processing is useful information in that it can be utilized on the advertiser side. When utilizing the feature amounts stored in the content display device 10, the advertiser side can acquire the feature amounts by, for example, communicating with the content display device 10 via a network.

When the display states of all the contents are appropriate (S118: YES), the display control unit 140 continues the current display states (S120). On the other hand, when there is a content whose display state is not appropriate (S118: NO), the display control unit 140 analyzes the state of the content and gazing person group corresponding to the content and adjusts the display state of the content based on a result of the analysis (S122). Further, for example, when the number of people in the group is small and accurate sampling data cannot be acquired, or when the position of the group or the distribution of the gazing points is dissipative and there is no feature amount, the display control unit 140 may determine that the display state is appropriate and continues the current display states.

For example, the display control unit 140 determines whether or not the display size of each content is appropriate, based on a gazing point rate of each content. Here, the gazing point rate of each content means a ratio of the total number of gazing points of each content to the total number of gazing points of all the contents detected in a predetermined period. For example, it is assumed that the total number of gazing points of the contents A, B, C, and D in a predetermined period is 20, 3, 7, and 10, respectively. In this case, the gazing point ratio of the content A is "20/40× 100=50.0%." Similarly, the gazing point rate of the content B is "7.5%," the gazing point rate of the content C is "17.5%," and the gazing point rate of the content D is "25%." Then, the display control unit 140 calculates an evaluation value of each content, using the gazing point rate of each content calculated in this way. Here, the "evaluation value of the content" is a value indicating a degree of interest in the content of a person located in the vicinity of the display region. For example, the display control unit 140 calculates a gazing point rate of each content as an evaluation value. Further, for example, the display control unit 140 may calculate, as an evaluation value, a value obtained by multiplying the gazing point rate of each content by the size of the group corresponding to each content (the number of people constituting the gazing person group). For example, when the distribution data as shown in FIG. 5 is acquired and the contents are displayed in the display region in the state shown in FIG. 6, the size of the group corresponding to the content A is 4, and therefore the evaluation value of the content A is "50.0%×4=2.0." Similarly, the evaluation value of the content B is "0.075," the evaluation value of the content C is "0.35," and the evaluation value of the content D is "0.75." Then, the display control unit 140 determines a display size of each content based on the evaluation value calculated for each content. Here, the magnitude relationship of the evaluation values among the contents is the evaluation value of the content A>the evaluation value of the content D>the evaluation value of the content C>the evaluation value of the content B. Therefore, the display control unit 140 determines the display size of each content so that the display size becomes smaller in the order of the content A, the content D, the content C, and the content B.

Further, the display control unit 140 determines a display position of each content based on the position information of each person belonging to the group corresponding to each content. For example, the display control unit 140 can calculate an average position of people belonging to the group corresponding to each content, and determine a display position of the content according to the average position.

Figure 8:
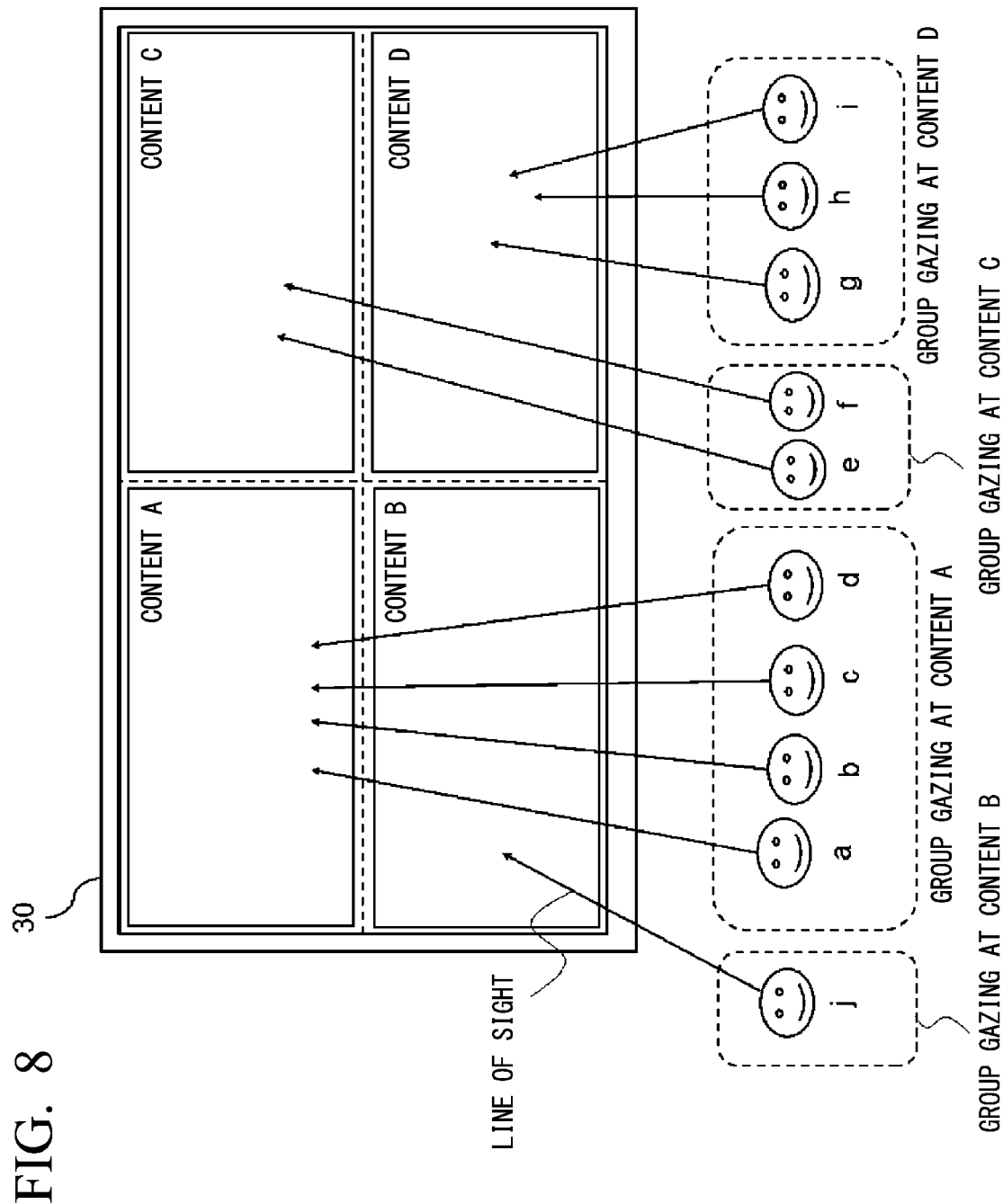
FIG. 8 is a diagram illustrating a flow in which a display mode of each content is changed by processing of a display control unit.
Figure 9:
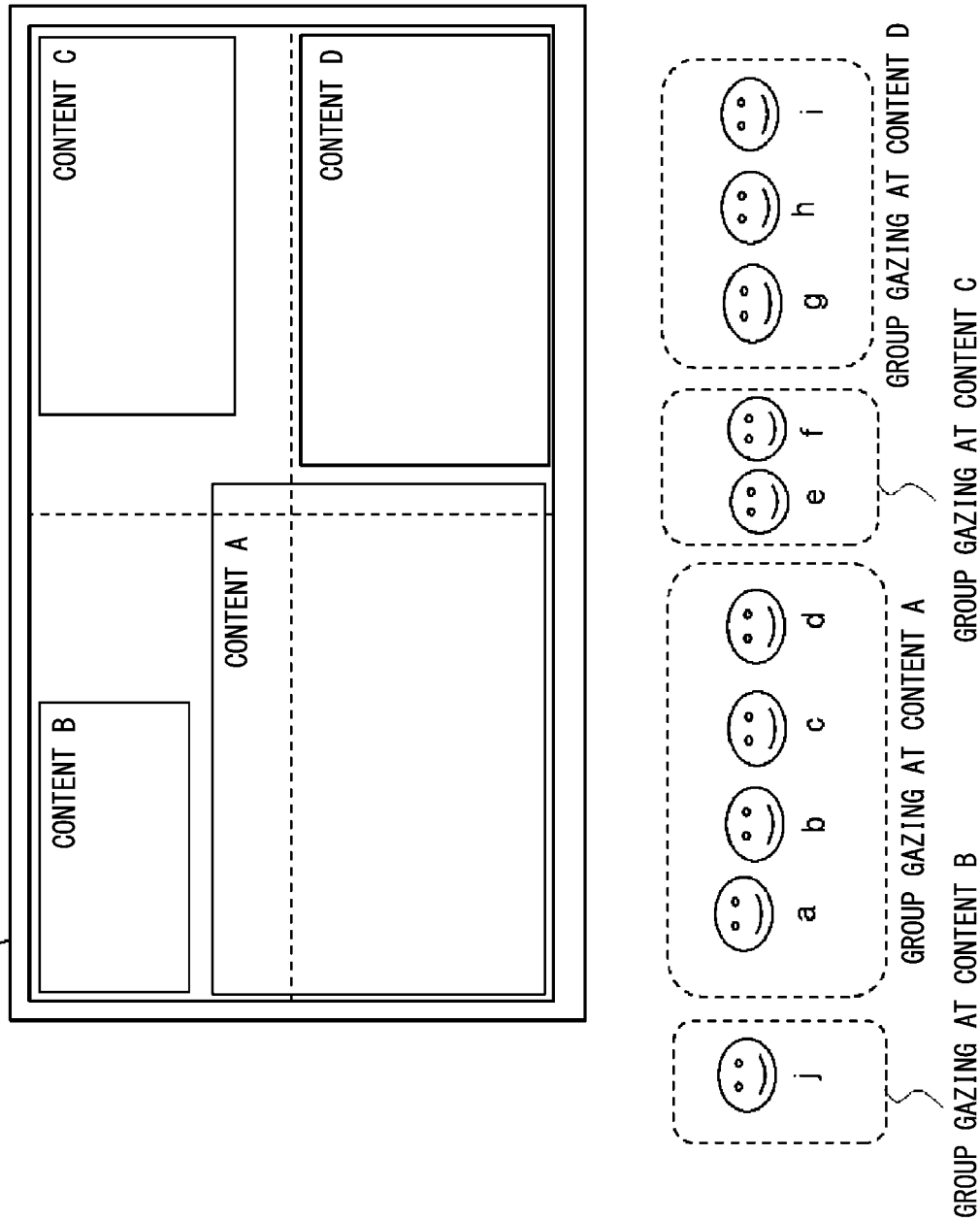
FIG. 9 is a diagram illustrating the flow in which the display mode of each content is changed by the processing of the display control unit.

As a result, as illustrated in FIGS. 8 and 9, the display state of each content on the display region is controlled. FIGS. 8 and 9 are diagrams illustrating a flow in which the display mode of each content is changed by the processing of the display control unit 140. Compared with the state of FIG. 8, in FIG. 9, the display sizes are smaller in the order of content A, content D, content C, and content B. Further, in FIG. 9, the display position of the content A and the display position of the content B are interchanged based on the average position of the group watching each content.

Here, the processing flow shown in this figure is just an example. The processing according to the present embodiment is not limited to the processing shown in this figure. For example, when there is only one person present in the vicinity of the display region, the process of determining the gazing person group in S116 is not executed. In this case, the display control unit 140 determines in the process of S118 whether the display state of each content is appropriate, based on the distribution of the gazing points of the one person. For example, the display control unit 140 can determine whether the content at which the person is gazing is displayed at a position that is easy for the person to see (for example, a position close to the position of the person), and control the display state of each content using a result of the determination.

As described above, in the present embodiment, the display state of each content is controlled so as to be easy for the person viewing each content to see, based on the distribution of the gazing points of each person detected in a predetermined period. In this way, the content displayed in the display region is presented to the viewer in an easy-to-see manner, thereby enabling an increase in the effects of the contents.

Second Embodiment

The content display device 10 according to the present embodiment has the same configuration as of the first embodiment except for the points described below.
<Functional Configuration Example>
A functional configuration diagram of the content display device 10 according to the second embodiment is the same as the diagram (FIG. 1) of the first embodiment.

Figure 10:
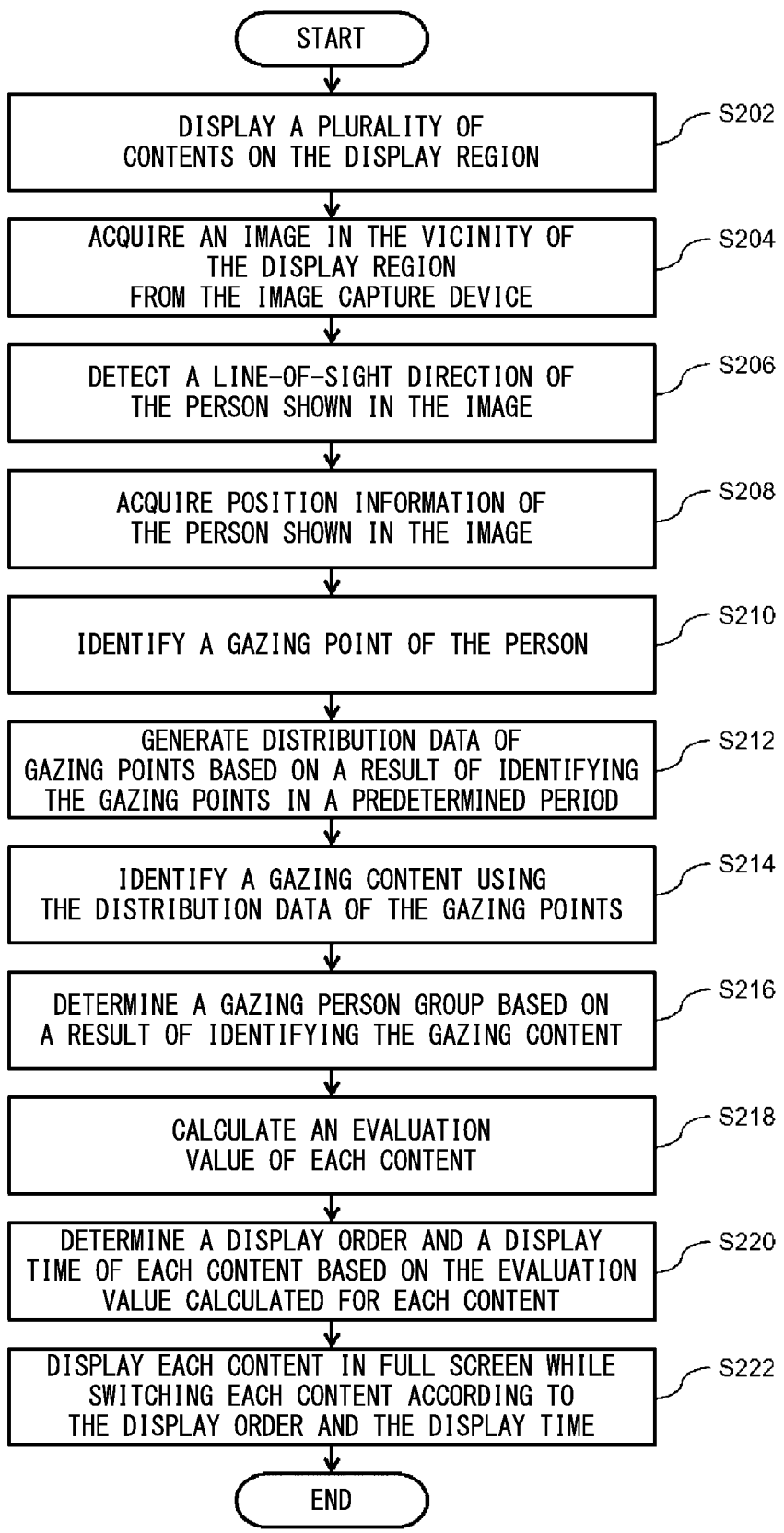
FIG. 10 is a flowchart illustrating a flow of processing executed by a content display device according to a second embodiment.

The display control unit 140 of the present embodiment calculates an evaluation value of each content. Here, the "evaluation value of a content" is a value indicating a degree of interest in the content of a person located in the vicinity of the display region. For example, as described in the first embodiment, the display control unit 140 can calculate an evaluation value of each content, using a ratio of the total number of gazing points of each content to the total number of gazing points of all contents detected in a predetermined period (i.e., a gazing point rate of each content). Further, as described in the first embodiment, the display control unit 140 may be configured to calculate an evaluation value, using the gazing point rate of each content and the size of the group for each content (the number of people constituting the gazing person group). Then, the display control unit 140 determines a display order and a display time of each content based on the evaluation value calculated for each content. Then, according to the display order and the display time determined based on the evaluation value, the display control unit 140 displays the plurality of contents in the display region while switching the plurality of contents.
<Processing Flow>
FIG. 10 is a flowchart illustrating a flow of processing executed by the content display device 10 according to the second embodiment. Hereinafter, processes different from those of the first embodiment will be mainly described.

Regarding the processes exemplified in FIG. 10, the processes of S202 to S216 are the same as the processes of S102 to S116 of the first embodiment. Therefore, the description of these processes will be omitted.

In the present embodiment, after the gazing person group is determined for each content, the display control unit 140 calculates an evaluation value of each content (S218). For example, as in the first embodiment, the display control unit 140 calculates, as the evaluation value, the gazing point rate of each content, or a value obtained by multiplying the gazing point rate of each content by the size of the group corresponding to each content (the number of people constituting the gazing person group).

Then, the display control unit 140 determines a display order and a display time of each content based on the evaluation value calculated for each content (S220). For example, the display control unit 140 determines the display order of each content so that the contents are displayed in the display region in order from the one with the highest evaluation value. As a specific example, a case where the magnitude relationship of the evaluation values among the contents is the evaluation value of the content A>the evaluation value of the content D>the evaluation value of the content C>the evaluation value of the content B is considered. In this case, the display control unit 140 determines the display order of the content A as the first place, the display order of the content D as the second place, the display order of the content C as the third place, and the display order of the content B as the fourth place. Further, for example, the display control unit 140 determines, as a display time of each content, a time obtained by multiplying a reference display time (for example, 60 seconds) by the evaluation value of each content. As a specific example, a case where the magnitude relationship of the evaluation values among the contents is "2.0" for the evaluation value of the content A, "0.075" for the evaluation value of the content B, "0.35" for the evaluation value of the content C, and "0.75" for the evaluation value of the content D is considered. In this case, the display control unit 140 determines, as the display time of the content A, 120 [seconds] obtained by multiplying the reference display time 60 [seconds] by the evaluation value 2.0 of the content A. Similarly, the display control unit 140 determines that the display time of the content B is 4.5 [seconds], the display time of the content C is 21 [seconds], and the display time of the content D is 45 [seconds].

Then, the display control unit 140 displays each content in full screen while switching each content according to the display order determined in the process of S204 and the display time determined in the process of S206 (S222). In the process of S222, the display in the display region is changed as shown in FIG. 11, for example.

Figure 11:
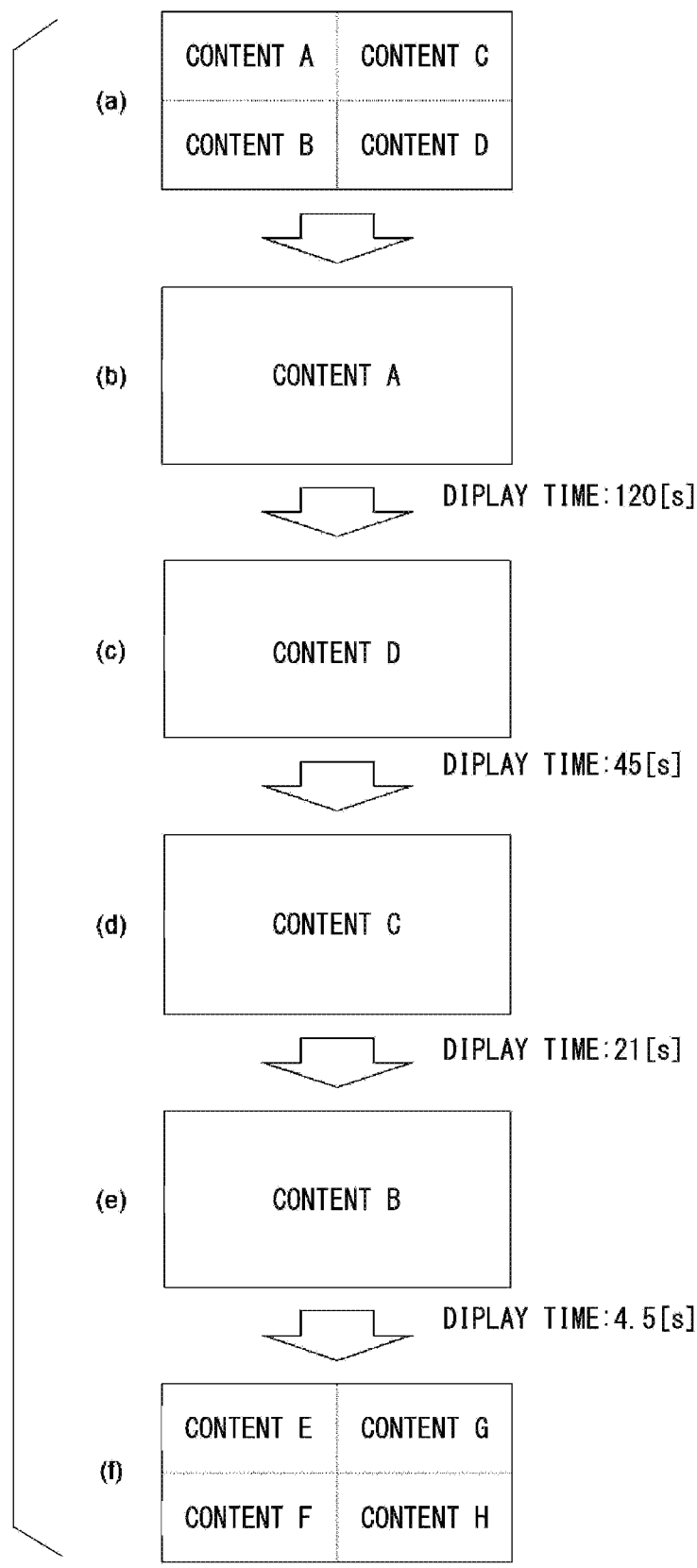
FIG. 11 is a diagram illustrating a state in which the display of the display region is changed by the processing of a display control unit of the second embodiment.

FIG. 11 is a diagram illustrating a state in which the display of the display region is changed by the processing of the display control unit 140 of the second embodiment. As shown in FIG. 11, a plurality of contents are simultaneously displayed for a predetermined period in order to collect information on the gazing points for each content ((a) in FIG. 11). After that, the content A having the highest evaluation value is displayed in the display region for 120 seconds ((b) in FIG. 11). Then, the content D having the second highest evaluation value is displayed in the display region for 45 seconds ((c) in FIG. 11). Then, the content C having the third highest evaluation value is displayed in the display region for 21 seconds ((d) in FIG. 11). Then, the content B having the fourth highest evaluation value is displayed in the display region for 4.5 seconds ((e) in FIG. 11). Then, when the display of each content is completed, a plurality of contents are newly selected and displayed in the display region ((f) in FIG. 11).

The processing flow shown in this figure is just an example. The processing according to the present embodiment is not limited to the processing shown in this figure. For example, when there is only one person present in the vicinity of the display region, the process of determining the gazing person group in S216 is not executed. In this case, in the process of S218, for example, the display control unit 140 calculates the gazing point rate of each content for the one person as the evaluation value of each content, and determines a display order and a display time of each content based on the evaluation value of each content calculated in this way. Then, the display control unit 140 displays each content in the display region while switching each content according to the determined display order and display time.

As described above, in the present embodiment, the higher the degree of interest in a content of the person viewing the content in the vicinity of the display region (that is, the content with a higher probability of effect), the higher priority is given to the display order and the display time when the content is displayed in full screen in the display region. This can increase the effects of the contents of interest.

Third Embodiment

A content display device according to the present embodiment has the same configuration as that of the first embodiment or the second embodiment except for the points described below.

<Functional Configuration Example>

Figure 12:
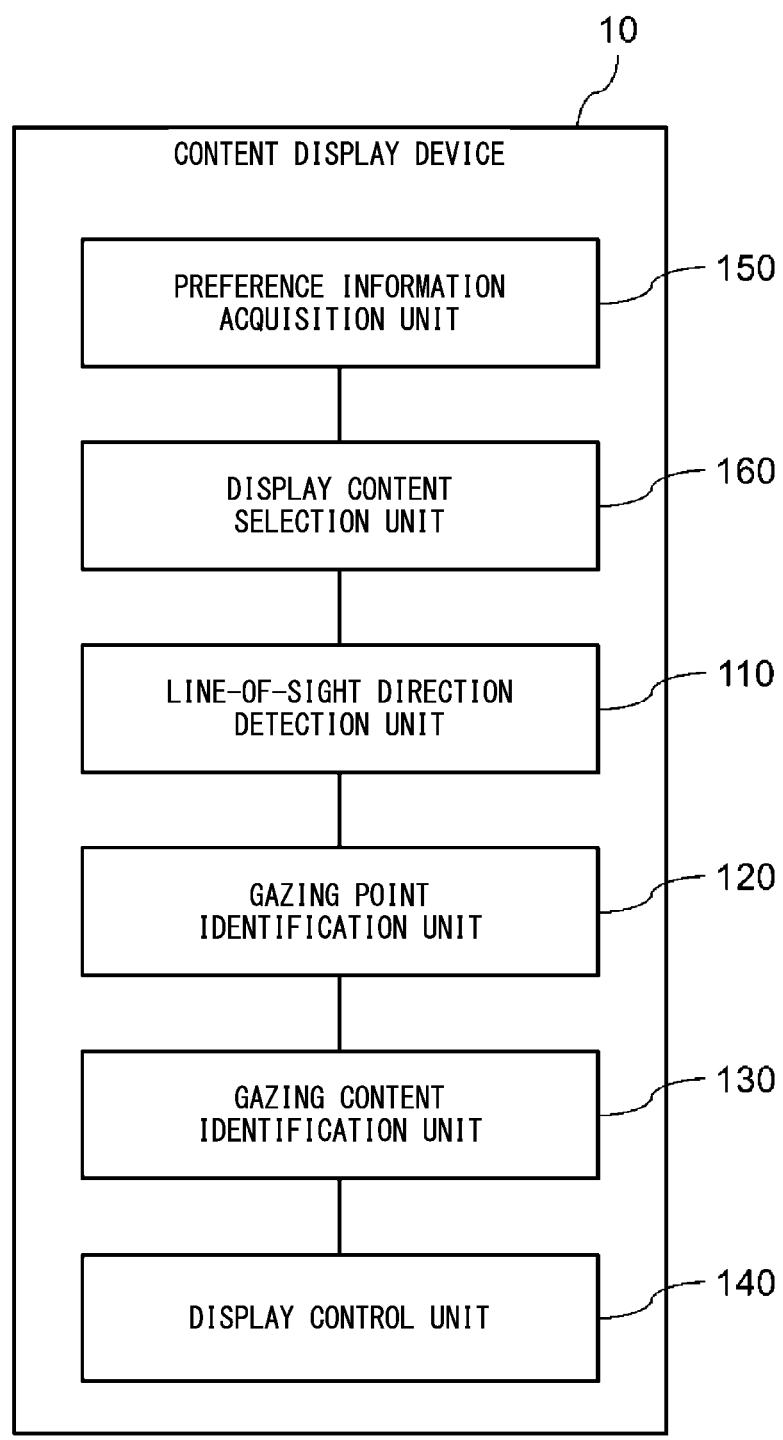
FIG. 12 is a diagram illustrating a functional configuration of a content display device according to a third embodiment.

FIG. 12 is a diagram illustrating a functional configuration of the content display device 10 according to the third embodiment. The content display device 10 of the present embodiment further includes a preference information acquisition unit 150 and a display content selection unit 160.

Figure 13:
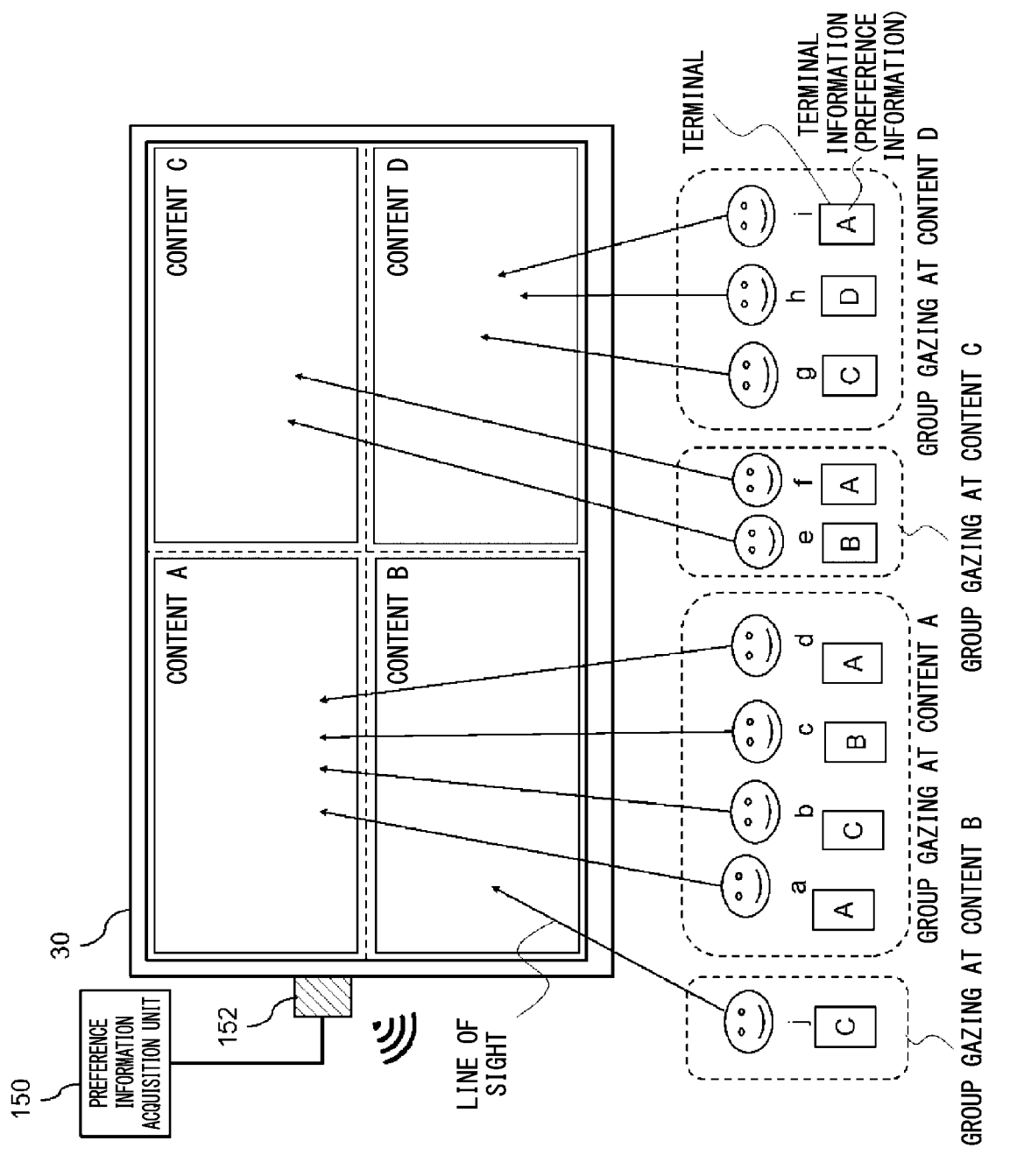
FIG. 13 is a diagram showing an installation example of a wireless communication device.

The preference information acquisition unit 150 acquires terminal information from a terminal owned by a person located in the vicinity of the display region via a wireless communication device 152 arranged in the vicinity of the display region (example: FIG. 13). FIG. 13 is a diagram showing an installation example of the wireless communication device 152. In the example of FIG. 13, the wireless communication device 152 is attached to the video device 30 (example: display) and performs wireless communication with the terminal owned by the person located in the vicinity of the display region of the video device 30. For example, using a short-range wireless communication standard such as Bluetooth (registered trademark) to perform wireless communication with the terminal in the vicinity of the display region, the wireless communication device 152 can acquire terminal information stored in the terminal. The terminal information includes at least preference information indicating a preference of the person who owns the terminal. The terminal information may further include information indicating a position of the terminal, such as GPS (Global Positioning System) information. The wireless communication device 152 transmits the terminal information acquired from each terminal to the preference information acquisition unit 150.

<<About Preference Information>>

The preference information is stored in the terminal in each person's daily life. For example, a keyword entered in a search engine, information on a page viewed on a browser, information on a place determined based on location information of the terminal (the place where the person who owns the terminal stopped by), and the like are stored in the terminal as the information indicating the preference of the person. Here, if a monitor, a projector, or the like is installed in an exhibition hall, a museum, a venue for a sporting event, or the like, a questionnaire registration may be requested on the terminal or a dedicated application may be distributed at the time of admission. It is possible to collect more preference information from people who are highly interested. Further, a dedicated terminal may be rented out at an exhibition hall, a museum, or a venue for a sporting event. By using the dedicated terminal, it becomes easier for an operator side of the facility or event to collect the preference information of each person. Further, since there is no risk of leaking highly confidential information of the terminal owned by the person who visits the facility or event, there is an advantage that the person can safely disclose specific preference information.

Further, the preference information acquisition unit 150 may analyze indirect keywords and abstract information to estimate a priority of the preference information. For example, the preference information acquisition unit 150 performs the following processing. First, using priority keywords of the preference information in each content (information A, information B, . . . ), the preference information acquisition unit 150 estimates a content that matches, by high correlation with, the preference information acquired from the terminal of each person who visually recognizes the display region. For example, the preference information acquisition unit 150 calculates the number of appearances, the frequency of appearance, and the like of a priority keyword set for each content in the preference information acquired from each terminal, and based on a result of the calculation, estimates a content that can be determined to be "highly correlated." Here, the priority keywords for each content are preset by the operator side of the facility or event. Information on the priority keywords is stored in, for example, the storage device 1040 of the content display device 10 or a storage device of an external device (not shown) communicably connected to the content display device 10. The preference information acquisition unit 150 can determine a priority order of each content, based on an index (an index indicating a degree of matching with the preference information), such as the number of appearances and the frequency of appearance of the priority keyword for each content.

The display content selection unit 160 selects a plurality of contents to be displayed in the display region, based on a result of collecting the preference information from the terminal of the person located in the vicinity of the display region.

For example, it is assumed that a result as shown in FIG. 14 is obtained as the result of collecting the preference information by the preference information acquisition unit 150. FIG. 14 is a diagram showing an example of the result of collecting the preference information. According to the collection result of the preference information exemplified in FIG. 14, the following can be understood.

- 33% of the people located in the vicinity of the display region are interested in information A, which ratio is the highest.
- 25% of the people located in the vicinity of the display region are interested in information C, which ratio is the second highest.
- 16% of people located in the vicinity of the display region are interested in information B, which ratio is the third highest.
- 8% of people located in the vicinity of the display region are interested in information D, which ratio is the fourth highest.

In this case, the display content selection unit 160 selects from the storage unit (not shown) storing contents, a content corresponding to the information ranked at a predetermined threshold place or higher in the result of collecting the preference information. For example, when the result as illustrated in FIG. 14 is obtained, the display content selection unit 160 selects, as the contents to be displayed in the display region, the content A corresponding to the information A, the content C corresponding to the information C, the content B corresponding to the information B, and the content D corresponding to the information D. For example, the content display device 10 randomly arranges and displays these contents selected by the display content selection unit 160 in the plurality of small regions set on the display region.

<Processing Flow>

Figure 15:
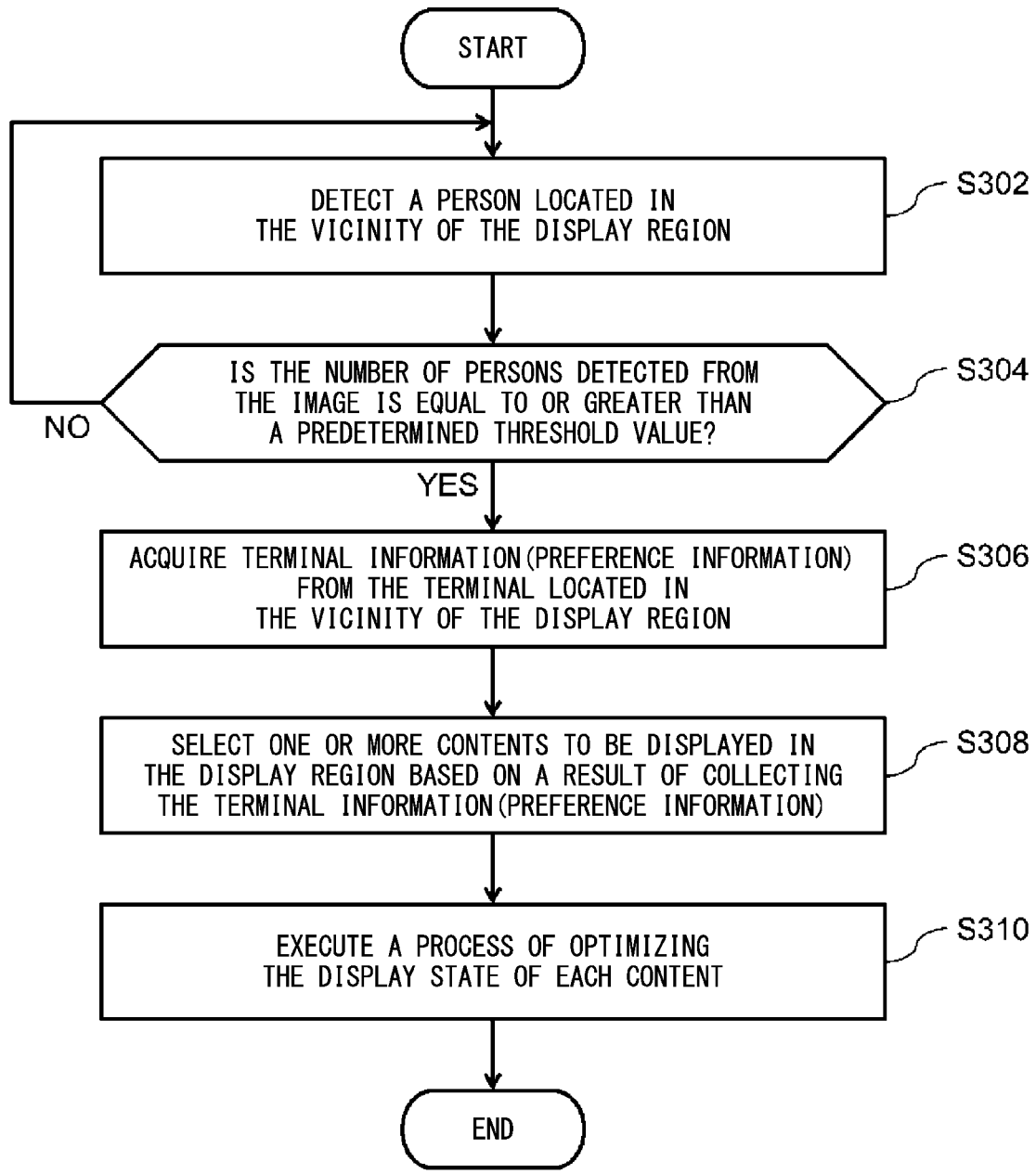
FIG. 15 is a flowchart illustrating a flow of processing executed by the content display device according to the third embodiment.

FIG. 15 is a flowchart illustrating a flow of processing executed by the content display device 10 according to the third embodiment.

First, the content display device 10 detects a person located in the vicinity of the display region from the image acquired from the image capture device 20 (S302). The content display device 10 can detect an individual person from an image using a known person recognition algorithm. Then, the content display device 10 determines whether or not the number of persons detected from the image is equal to or greater than a predetermined threshold value (S304).

When the number of persons detected from the image is equal to or greater than the predetermined threshold (S304: YES), the content display device 10 acquires, using the preference information acquisition unit 150, terminal information including preference information of the person from the terminal of the person located in the vicinity of the display region (S306). At this time, the preference information acquisition unit 150 may further acquire position information of the terminal as the position information of the person used by the gazing point identification unit 120 in identifying the gazing points of the person. Then, the display content selection unit 160 selects a plurality of contents to be displayed in the display region, based on a result of collecting the terminal information (preference information) acquired by the preference information acquisition unit 150 (S308). Then, the content display device 10 executes a process of optimizing the display state of each content (process described in the first embodiment or the second embodiment) for the plurality of contents selected based on the preference information (S310).

On the other hand, when the number of persons detected from the image is less than the predetermined threshold value (S304: NO), the content display device 10 does not execute the processes of S306 and S308, and repeatedly executes the determination process of S304 until a predetermined threshold number of persons or more is detected from the image. Not limited to this, the content display device 10 may randomly determine a plurality of contents to be displayed in the display region as described in the first and second embodiments, and execute the processes described in the first embodiment or the second embodiment for the plurality of contents.

Here, the processing flow shown in this figure is just an example. The processing according to the present embodiment is not limited to the processing shown in this figure. For example, the preference information acquisition unit 150 may acquire terminal information (preference information) from a terminal located in the vicinity of the display region, regardless of the number of persons located in the vicinity of the display region (that is, without executing the determination process of S304). As a specific example, when there is only one person present in the vicinity of the display region, the preference information acquisition unit 150 acquires the terminal information (preference information) from the terminal of the one person. Then, the display content selection unit 160 selects one or more contents to be displayed in the display region, based on the acquired terminal information (preference information). Then, the display control unit 140 executes the process of optimizing the display state of each content (process described in the first embodiment or the second embodiment) for the one or more contents selected by the display content selection unit 160.

As described above, in the present embodiment, a content that is expected to attract the interest of more people is determined as the content to be displayed in the display region, based on the preference information of a plurality of people located in the vicinity of the display region. As a result, the effects achieved when displaying these plural contents can be improved. Further, in the present embodiment, as in the first and second embodiments, the display position of each content is controlled based on the distribution of the gazing points and the display position of each content. This makes it possible to provide contents in a state that is easy for each person to see, even if the preference information acquired from the terminal and the potential interests acquired by analyzing the actual image are different.

Although the embodiments of the present disclosure have been described above with reference to the drawings, the embodiments should not be construed as being limited to these, and various changes, improvements, and the like can be made based on the knowledge of those skilled in the art as long as they do not deviate from the gist of the present disclosure. The plurality of components disclosed in the embodiments can form various embodiments by appropriate combinations. For example, some components may be deleted from all the components shown in the embodiments, or components of different embodiments may be combined as appropriate.

Further, the content display device 10 according to the above embodiments can be suitably applied even in an environment where a person sits at a specific position, such as a conference room or a seminar. For example, even if there is no seat selection in the conference room and multiple conference attendees sit in a biased arrangement, the information of interest to each person can be automatically displayed in an easy-to-see position and size.

Further, in the plurality of flowcharts used in the above description, the plurality of steps (processes) are described in order, but the execution order of the steps executed in each embodiment is not limited to the described order. In each embodiment, the order of the illustrated steps can be changed as long as it does not hinder the contents. In addition, the above-described embodiments can be combined as long as the contents do not conflict with each other.

A part or all of the above-described embodiments may be described as in, but is not limited to, the following notes:

1. A content display device comprising:
    line-of-sight direction detection means configured to detect a line-of-sight direction of a person located in a vicinity of a display region in which a plurality of contents are simultaneously displayed;
    gazing point identification means configured to, based on the line-of-sight direction, identify a gazing point in the display region of the person;
    gazing content identification means configured to, based on a distribution of the gazing point detected in a predetermined period, identify a gazing content at which the person is gazing; and
    display control means configured to
      determine a display mode of each of the plurality of contents, based on a result of identifying the gazing content, and
      display each of the plurality of contents in the display mode determined.

2. The content display device according to note 1, wherein the display control means is further configured to
    calculate an evaluation value of each of the plurality of contents, using a ratio of a total number of gazing points for each of the plurality of contents to a total number of gazing points for all of the plurality of contents detected in the predetermined period, and
    determine a display size of each of the plurality of contents, based on the evaluation value calculated for each of the plurality of contents.

3. The content display device according to note 1 or 2, wherein
    the display control means is further configured to determine a display position of each of the plurality of contents, based on position information of the person corresponding to each of the plurality of contents.

4. The content display device according to note 1, wherein the display control means is further configured to
    calculate an evaluation value of each of the plurality of contents, using a ratio of a total number of gazing points for each of the plurality of contents to a total number of gazing points for all of the plurality of contents detected in the predetermined period, and
    according to a display order and a display time determined based on the evaluation value calculated for each of the plurality of contents, display the plurality of contents in the display region while switching the plurality of contents.

5. The content display device according to any one of notes 1 to 4, further comprising:
    preference information collection means configure to communicate with a terminal owned by the person located in the vicinity of the display region, and
    collect preference information of the person; and
    display content selection means configured to, based on a result of collecting the preference information, select the plurality of contents to be displayed in the display region.

6. A content display method for a computer comprising:
    detecting a line-of-sight direction of a person located in a vicinity of a display region in which a plurality of contents are simultaneously displayed;
    based on the line-of-sight direction, identifying a gazing point in the display region of the person;
    based on a distribution of the gazing point detected in a predetermined period, identifying a gazing content at which the person is gazing;
    determining a display mode of each of the plurality of contents, based on a result of identifying the gazing content; and
    displaying each of the plurality of contents in the display mode determined.

7. The content display method according to note 6, further comprising:
    calculating an evaluation value of each of the plurality of contents, using a ratio of a total number of gazing points for each of the plurality of contents to a total number of gazing points for all of the plurality of contents detected in the predetermined period; and
    determining a display size of each of the plurality of contents, based on the evaluation value calculated for each of the plurality of contents.

8. The content display method according to note 6 or 7, further comprising:
    determining a display position of each of the plurality of contents, based on position information of the person corresponding to each of the plurality of contents.

9. The content display method according to note 6, further comprising:
    calculating an evaluation value of each of the plurality of contents, using a ratio of a total number of gazing points for each of the plurality of contents to a total number of gazing points for all of the plurality of contents detected in the predetermined period; and
    according to a display order and a display time determined based on the evaluation value calculated for each of the plurality of contents, displaying the plurality of contents in the display region while switching the plurality of contents.

10. The content display method performed according to any one of notes 6 to 9, further comprising:
    communicating with a terminal owned by the person located in the vicinity of the display region;
    collecting preference information of the person; and
    based on a result of collecting the preference information, selecting the plurality of contents to be displayed in the display region.

11. A non-transitory computer-readable storage medium storing a program causing a computer to:
    detect a line-of-sight direction of a person located in a vicinity of a display region in which a plurality of contents are simultaneously displayed;
    based on the line-of-sight direction, identify a gazing point in the display region of the person;
    based on a distribution of the gazing point detected in a predetermined period, identify a gazing content at which the person is gazing; and determine a display mode of each of the plurality of contents, based on a result of identifying the gazing content; and display each of the plurality of contents in the display mode determined.

12. The non-transitory computer-readable storage medium according to note 11, wherein the program further causes the computer to:

calculate an evaluation value of each of the plurality of contents, using a ratio of a total number of gazing points for each of the plurality of contents to a total number of gazing points for all of the plurality of contents detected in the predetermined period; and determine a display size of each of the plurality of contents, based on the evaluation value calculated for each of the plurality of contents.

13. The non-transitory computer-readable storage medium according to note 11 or 12, wherein the program further causes the computer to:

determine a display position of each of the plurality of contents, based on position information of the person corresponding to each of the plurality of contents.

14. The non-transitory computer-readable storage medium according to note 11, wherein the program further causes the computer to:

calculate an evaluation value of each of the plurality of contents, using a ratio of a total number of gazing points for each of the plurality of contents to a total number of gazing points for all of the plurality of contents detected in the predetermined period; and according to a display order and a display time determined based on the evaluation value calculated for each of the plurality of contents, display the plurality of contents in the display region while switching the plurality of contents.

15. The non-transitory computer-readable storage medium according to any one of notes 11 to 14, wherein the program further causes the computer to:

communicate with a terminal owned by the person located in the vicinity of the display region;

collect preference information of the person; and display content selection means configured to, based on a result of collecting the preference information, select the plurality of contents to be displayed in the display region.

The invention claimed is:

1. A content display device comprising:

line-of-sight direction detection circuitry configured to detect a line-of-sight direction of a person located in a vicinity of a display region in which a plurality of contents are simultaneously displayed;

gazing point identification circuitry configured to, based on the line-of-sight direction, identify a gazing point in the display region of the person;

gazing content identification circuitry configured to, based on a distribution of the gazing point detected in a predetermined period, identify a gazing content at which the person is gazing; and display control circuitry configured to determine a display mode of each of the plurality of contents, based on a result of identifying the gazing content, and display each of the plurality of contents in the display mode determined, wherein the display control circuitry is further configured to calculate an evaluation value of each of the plurality of contents, using a ratio of a total number of gazing points for each of the plurality of contents to a total number of gazing points for all of the plurality of contents detected in the predetermined period, and determine a display size of each of the plurality of contents, based on the evaluation value calculated for each of the plurality of contents.

2. The content display device according to claim 1, wherein the display control circuitry is further configured to determine a display position of each of the plurality of contents, based on position information of the person corresponding to each of the plurality of contents.

3. The content display device according to claim 1, wherein the display control circuitry is further configured to, according to a display order and a display time determined based on the evaluation value calculated for each of the plurality of contents, display the plurality of contents in the display region while switching the plurality of contents.

4. The content display device according to claim 1, further comprising:

preference information collection circuitry configured to communicate with a terminal owned by the person located in the vicinity of the display region, and collect preference information of the person; and display content selection circuitry configured to, based on a result of collecting the preference information, select the plurality of contents to be displayed in the display region.

5. A content display method for a computer comprising:

detecting a line-of-sight direction of a person located in a vicinity of a display region in which a plurality of contents are simultaneously displayed;

based on the line-of-sight direction, identifying a gazing point in the display region of the person;

based on a distribution of the gazing point detected in a predetermined period, identifying a gazing content at which the person is gazing;

determining a display mode of each of the plurality of contents, based on a result of identifying the gazing content; and displaying each of the plurality of contents in the display mode determined, wherein the content display method further comprises:

calculating an evaluation value of each of the plurality of contents, using a ratio of a total number of gazing points for each of the plurality of contents to a total number of gazing points for all of the plurality of contents detected in the predetermined period; and determining a display size of each of the plurality of contents, based on the evaluation value calculated for each of the plurality of contents.

6. The content display method according to claim 5, further comprising:

determining a display position of each of the plurality of contents, based on position information of the person corresponding to each of the plurality of contents.

7. The content display method according to claim 5, further comprising:

according to a display order and a display time determined based on the evaluation value calculated for each of the plurality of contents, displaying the plurality of contents in the display region while switching the plurality of contents.

8. The content display method according to claim 5, further comprising:
- communicating with a terminal owned by the person located in the vicinity of the display region;
- collecting preference information of the person; and
- based on a result of collecting the preference information, selecting the plurality of contents to be displayed in the display region.

9. A content display method for a computer comprising:
- detecting a line-of-sight direction of a person located in a vicinity of a display region in which a plurality of contents are simultaneously displayed;
- based on the line-of-sight direction, identifying a gazing point in the display region of the person;
- based on a distribution of the gazing point detected in a predetermined period, identifying a gazing content at which the person is gazing;
- determining a display mode of each of the plurality of contents, based on a result of identifying the gazing content; and
- displaying each of the plurality of contents in the display mode determined,
- wherein the content display method further comprises:
- calculating an evaluation value of each of the plurality of contents, using a ratio of a total number of gazing points for each of the plurality of contents to a total number of gazing points for all of the plurality of contents detected in the predetermined period; and
- according to a display order and a display time determined based on the evaluation value calculated for each of the plurality of contents, displaying the plurality of contents in the display region while switching the plurality of contents.

10. The content display method according to claim 9, further comprising:
- determining a display size of each of the plurality of contents, based on the evaluation value calculated for each of the plurality of contents.

11. The content display method according to claim 9, further comprising:
- determining a display position of each of the plurality of contents, based on position information of the person corresponding to each of the plurality of contents.

12. The content display method according to claim 9, further comprising:
- communicating with a terminal owned by the person located in the vicinity of the display region;
- collecting preference information of the person; and
- based on a result of collecting the preference information, selecting the plurality of contents to be displayed in the display region.

* * * * *